United States Patent
Lafuite et al.

(10) Patent No.: US 6,567,863 B1
(45) Date of Patent: May 20, 2003

(54) PROGRAMMABLE CONTROLLER COUPLER

(75) Inventors: Alain Lafuite, Nice (FR); Jean-Jacques Genin, Nice (FR)

(73) Assignee: Schneider Electric Industries SA, Rueil-Malmaison (FR)

( * ) Notice: Subject to any disclaimer, the term of this patent is extended or adjusted under 35 U.S.C. 154(b) by 0 days.

(21) Appl. No.: 09/601,320

(22) PCT Filed: Dec. 7, 1999

(86) PCT No.: PCT/FR99/03028

§ 371 (c)(1),
(2), (4) Date: Aug. 7, 2000

(87) PCT Pub. No.: WO00/34862

PCT Pub. Date: Jun. 15, 2000

(30) Foreign Application Priority Data

Dec. 7, 1998 (FR) ............................................. 98 15788

(51) Int. Cl.⁷ ................................................. G06F 3/00
(52) U.S. Cl. ............................... 710/8; 710/15; 710/23; 710/36; 711/100; 711/123; 711/126; 711/129; 711/173
(58) Field of Search ................................. 710/8, 15, 23, 710/36; 711/100, 123, 126, 129, 173

(56) References Cited

U.S. PATENT DOCUMENTS 5,675,769 A * 10/1997 Ruff et al. .................. 711/173
5,930,828 A * 7/1999 Jensen et al. ................ 711/170
6,185,575 B1 * 2/2001 Orcutt ......................... 707/200
6,466,962 B2 * 10/2002 Bollella ....................... 709/107

OTHER PUBLICATIONS

R.A. Quinnell, EDN Electrical Design News, vol. 42, No. 8, pps. 61–64, 66, 68, "Web Servers in Embedded Systems Enhance User Interaction," Apr. 10, 1997.

IBM Technical Disclosure Bulletin, vol. 38, No. 12, pps. 479, "Disk Drive with Embedded Hyper–Text Markup Language Server," Dec. 1, 1995.

E. Steinfeld, Electronic Engineering Times, No. 932, pps. 1–4, "Leveraging Browsers as Universal GUI's," Dec. 16, 1996.

* cited by examiner

*Primary Examiner*—Jeffrey Gaffin
*Assistant Examiner*—Rehana Perveen
(74) *Attorney, Agent, or Firm*—Oblon, Spivak, McClelland, Maier & Neustadt, P.C.

(57) ABSTRACT

A coupler for a programmable logic controller connecting to an Ethernet network under the TCP/IP protocol in order to communicate with various equipment. The coupler uses two disk partitions in a flash memory, one acting as a disk for the real time operating system and the other acting as a user disk. The two disks are accessed through the FTP protocol on TCP/IP, and the user disk space is managed by an HTTP server.

4 Claims, 1 Drawing Sheet

PROGRAMMABLE CONTROLLER COUPLER

BACKGROUND OF THE INVENTION

1. Field of the Invention

This invention relates to a programmable logic controller coupler that couples to an ETHERNET network under TCP/IP protocol in order to communicate with various equipment.

2. Discussion of the Background

Traditionally, an automation system is segmented into several levels. The lower level contains the sensors/actuators bus that enables exchanges between programmable logic controllers or numerical controls and sensors and actuators associated with them. At a higher level there is a computer type bus that connects computers responsible for supervision and the information system on the production site. There are buses at an intermediate level that form the junction between the previous levels.

It is known how to use the TCP/IP protocol and software adapted to this protocol for communications between the various levels of equipment on a PLC network, for example using an ETHERNET type bus. The programmable logic controllers are then equipped with a communication module or coupler that is coupled to an Internet or an Intranet type network using the TCP/IP protocol.

SUMMARY OF THE INVENTION

The purpose of this invention is to supply a programmable logic controller coupler using the ETHERNET, FTP, HTTP, TCP/IP technologies in order to host a WEB site accessible with a commercially available browser. It enables updates of system software, both in production and on the customer site, and can be used to customize a product range.

The system according to the invention is essentially characterized by the fact that it implements two disk partitions in flash memory, one acting as a disk for the real time operation system, the other acting as a user disk, access to these two disks being possible using the FTP protocol on TCP/IP, the user disk space being managed by an HTTP server.

BRIEF DESCRIPTION OF THE DRAWINGS

The invention will now be described with reference to an embodiment given as an example and shown in the attached drawing which.

DESCRIPTION OF THE PREFERRED EMBODIMENT

Figure 1:
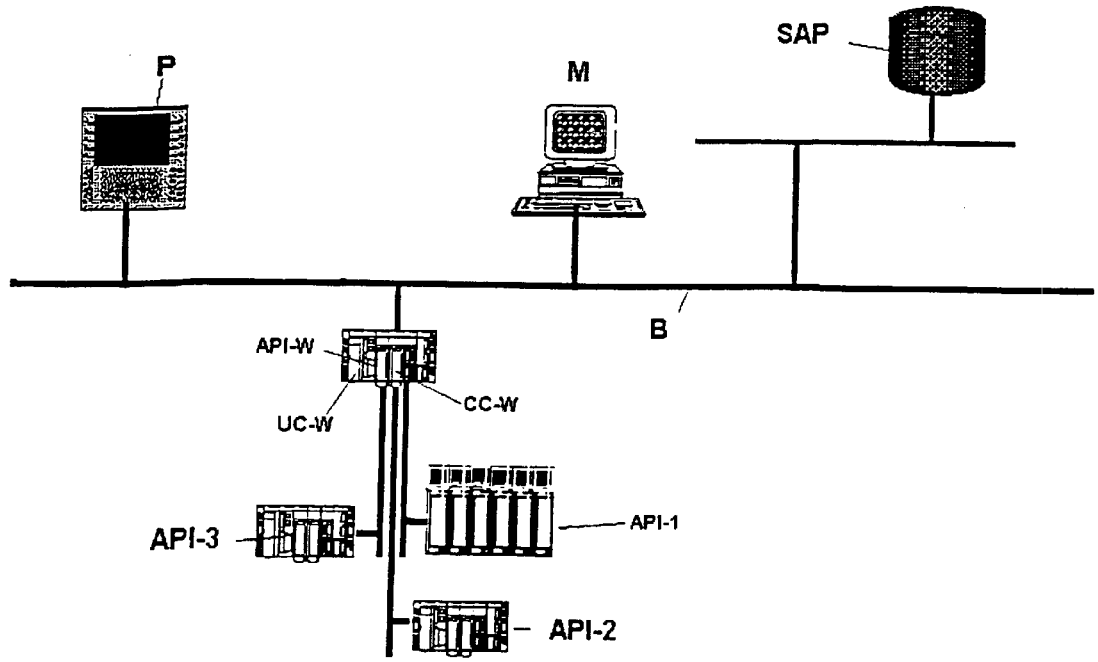
FIG. 1 is a diagram of an automation system comprising the coupler according to the invention.

The architecture shown in FIG. 1 comprises a PLC reference API-W equipped with a system unit UC and a communication coupler CC-W with a WEB server function. This server PLC API-W is connected by a coupler and by a cell network to other programmable logic controllers references API-1, API-2, API-3.

The system unit UC of each programmable logic controller contains an application program PAP written in a usual automation language (ladder, etc.). It manages inputs/outputs using PLC variables.

The CC-W coupler used as a server for the programmable logic controller API-W communicates with various equipment such as a SAP production management server, a P dialogue terminal or computers such as M, through a bus B supporting the TCP/IP protocol. It is provided with a flash mass memory and a microprocessor.

The coupler implements two disk partitions in flash memory, one used as a system disk and the other as a user disk. These disks are accessed through the FTP (File Transfer Protocol) protocol on TCP/IP. The user disk space is also managed by an HTTP server and thus offers a WEB server resident in the coupler.

The coupler real time operation system is seen like a system disk and is accessible with FTP under the TCP/IP protocol from a PC connected to INTRANET or INTERNET. Access is authorized under an account called the system account. The system may be updated remotely without any physical intervention on the coupler, while keeping the said coupler in normal operation. A restart command enables the user to take account of the new version when he wishes. This system account contains executable files, the system initialization file, a system diagnostic file and a test file for production. The names of downloaded files may be manipulated by a standard computer.

Figure 2:
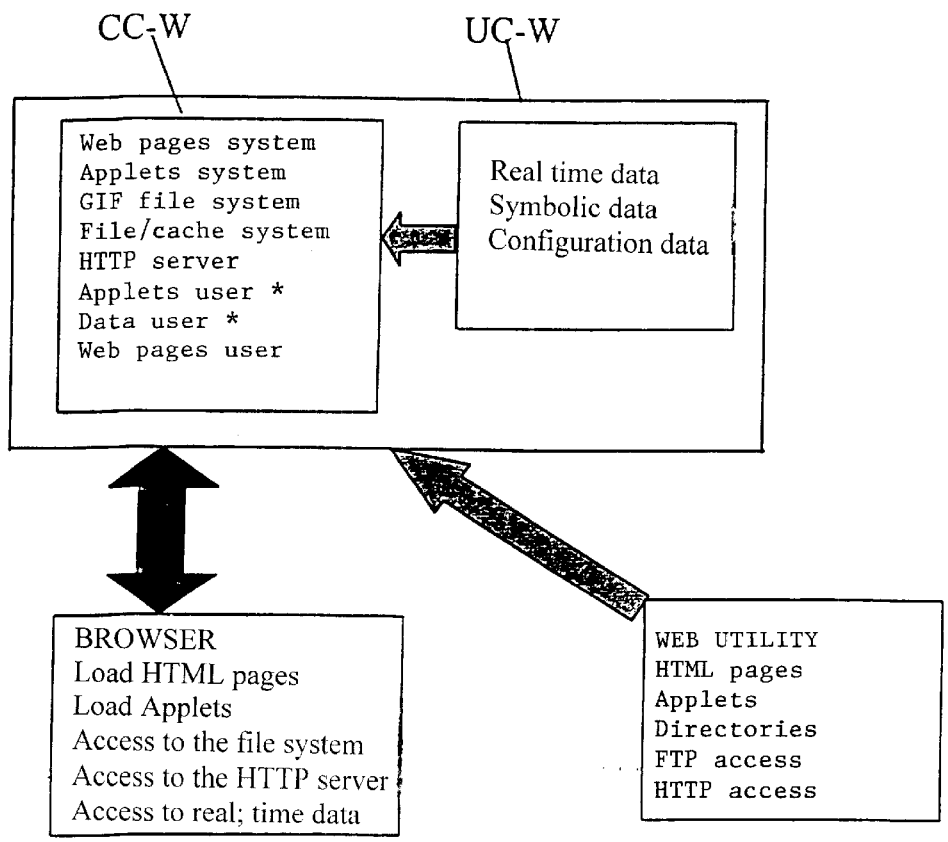
FIG. 2 diagrammatically illustrates access to the coupler flash memory.

The user disk space is accessible with FTP or HTTP under the TCP/IP protocol, from a computer connected to INTRANET or INTERNET. Access is authorized under an account called the user account. The user can store any file on his disk. For example, the user can store customer data files, pages in the HTML format, the JAVA executable code, or graphic data files (see FIG. 2).

The user disk, or the disk under FTP, can be accessed from a remote computer using the IP address of the coupler and software supporting FTP.

Operation will now be described:

An FTP session is opened on the system disk or the user disk by entering the appropriate account name and password dedicated to the disks. It is thus possible to customize a product range simply by transferring a file through FTP from a disk to the system account or the user account.

All data may be erased, modified or written in any way the user wishes. These data can be accessed through standard protocols that are used very frequently elsewhere (FTP, HTTP, TCP/IP, Ethernet) and by means of standard tools (WEB browser, FTP control tool, ETHERNET card, MODEM card). They survive mains power cuts and a coupler configuration change. The user does not need to store data in other computer equipment. The module includes all services and data necessary for its correct operation.

Obviously, it would be possible to imagine variants and improvements to detail and even consider the use of equivalent means, without going outside the scope of this invention.

What is claimed is:

1. Coupler for a programmable logic controller connecting to an Ethernet network (BE) under the TCP/IP protocol to communicate with various equipment, characterized by the fact that it uses two disk partitions in a flash memory, one acting as a disk for the real time operating system, the other acting as a user disk, these two disks being accessed through the FTP protocol on TCP/IP, and the user disk space being managed by an HTTP server.

2. Coupler according to claim 1, characterized by the fact that remote access to the system space is authorized with FTP under a system account so that the system can be updated remotely without any physical action on the coupler while keeping the said coupler in normal operation, and the user disk space can be remotely accessed with FTP or HTTP under an account called the user account.

3. Coupler according to claim 1, characterized by the fact that the system space contains executable files, a system initialization file, a system diagnostic file and a test file for production.

4. Coupler according to claim 2, characterized by the fact that the system space contains executable files, a system initialization file, a system diagnostic file and a test file for production.

* * * * *